United States Patent
Stapleton

(10) Patent No.: US 12,278,895 B1
(45) Date of Patent: Apr. 15, 2025

(54) AUTHENTICATION USING A KNOWLEDGE FACTOR IDENTIFICATION TRANSACTION WITH CHALLENGE AUTHENTICATION TOKEN

(71) Applicant: Wells Fargo Bank, N.A., San Francisco, CA (US)

(72) Inventor: Jeff J. Stapleton, O'Fallon, MO (US)

(73) Assignee: Wells Fargo Bank, N.A., San Francisco, CA (US)

( * ) Notice: Subject to any disclaimer, the term of this patent is extended or adjusted under 35 U.S.C. 154(b) by 259 days.

(21) Appl. No.: 18/054,441

(22) Filed: Nov. 10, 2022

(51) Int. Cl.
*H04L 9/32* (2006.01)
*H04L 9/08* (2006.01)
*H04L 9/40* (2022.01)

(52) U.S. Cl.
CPC .......... *H04L 9/0858* (2013.01); *H04L 9/3213* (2013.01); *H04L 63/083* (2013.01); *H04L 2463/082* (2013.01)

(58) Field of Classification Search
CPC ... H04L 9/0858; H04L 9/3213; H04L 63/083; H04L 2463/082
See application file for complete search history.

(56) References Cited

U.S. PATENT DOCUMENTS

| 9,787,696 B2 | 10/2017 | Sterne et al. |
| 10,764,752 B1 | 9/2020 | Avetisov et al. |
| 11,190,344 B2 | 11/2021 | Peddada et al. |
| 2007/0022196 A1* | 1/2007 | Agrawal ............. H04L 63/0815 709/225 |
| 2007/0118891 A1* | 5/2007 | Buer ...................... G06F 21/445 726/8 |
| 2007/0220007 A1* | 9/2007 | Narita ...................... G06F 21/31 707/999.009 |
| 2014/0149746 A1* | 5/2014 | Yau ........................ H04W 12/50 713/185 |
| 2019/0280860 A1* | 9/2019 | Peddada ................... H04L 9/14 |
| 2021/0112411 A1 | 4/2021 | Pazhyannur et al. |
| 2021/0336943 A1 | 10/2021 | Hamel et al. |
| 2021/0390533 A1 | 12/2021 | Fan et al. |

* cited by examiner

*Primary Examiner* — Joseph P Hirl
*Assistant Examiner* — Aayush Aryal
(74) *Attorney, Agent, or Firm* — K&L Gates LLP

(57) ABSTRACT

Systems, apparatuses, and computer program products are disclosed for authenticating a user using a knowledge factor identification transaction with a challenge authentication token. An example method includes providing a logon request, wherein the logon request comprises a user identifier received from a user. The example method further includes receiving a challenge sequence and generating a password structure, wherein the password structure is based on a static password received from the user and the challenge sequence. The example method further includes generating a challenge authentication token comprising the user identifier, the password structure, and a client timestamp and providing the challenge authentication token. The example method further includes receiving an authorization decision message, wherein the authorization decision message is indicative of whether the challenge authentication token was verified.

20 Claims, 7 Drawing Sheets

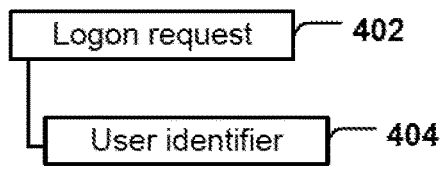
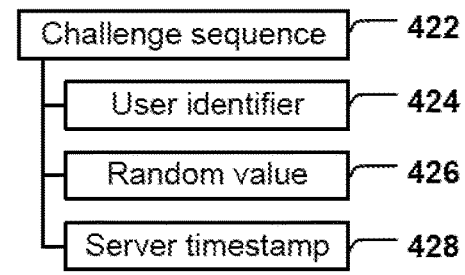
FIG. 4A
FIG. 4B
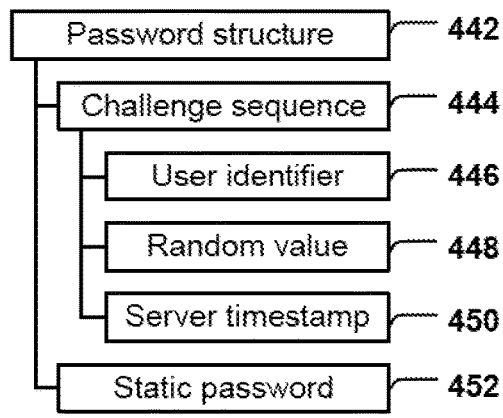
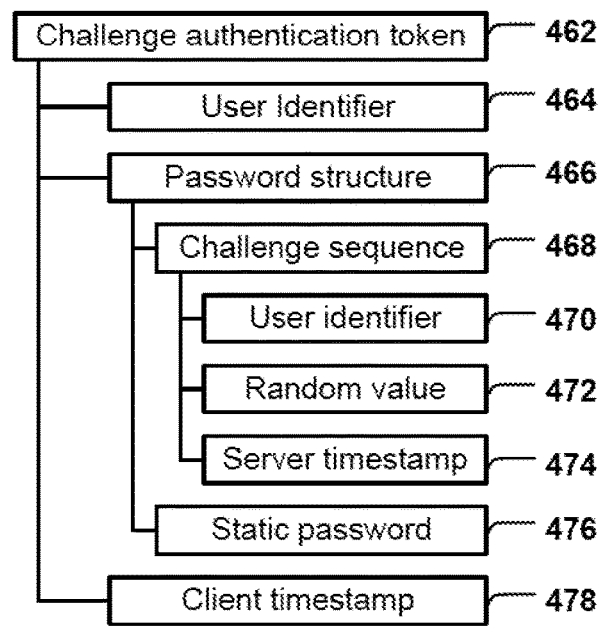
FIG. 4C
FIG. 4D

AUTHENTICATION USING A KNOWLEDGE FACTOR IDENTIFICATION TRANSACTION WITH CHALLENGE AUTHENTICATION TOKEN

TECHNOLOGICAL FIELD

Example embodiments of the present disclosure relate generally to authentication and, more particularly, to authentication systems and methods using a knowledge factor identification transaction using a challenge authentication token (KITCAT).

BACKGROUND

The notion of strong authentication for secure remote access may rely on integration of multiple technologies including biometric factors, dedicated devices, or one-time passwords using out-of-band communications. Such approaches increase the user interface complexity which may adversely affect authentication assurance levels.

BRIEF SUMMARY

Password authentication has long been the standard for secure remote access. Modern password verification typically uses a hash-based authentication schemes, where a password database stores user passwords in hashed form, a user inputs a password, and the server hashes the user password for comparison with a hashed password database. Many systems further use salted hashing to deter an exhaustive determination of popular passwords in the case where the hashed password database is compromised. Such password authentication schemes, and more broadly, knowledge factor-based single-factor authentication schemes, have several well-known limitations. The most notable limitation is the case where a hacker has access to the user's knowledge factor. Access to a knowledge factor may be obtained for example by intercepting communication of a password. Such limitations have prompted moves to so-called strong authentication schemes, such as multi-factor authentication.

Previous forms of strong authentication have moved toward utilizing multi-factor authentication (MFA) with such technologies as biometric factors, dedicated devices in a user's possession, or one-time passwords (OTPs) using out-of-band communications. MFA are still susceptible to intercepted, rerouted, and/or phishing scams. For example, MFA systems which implement OTPs provide users with the OTP value in plaintext and require manual entry on the OTP value by the user, thereby creating a security vulnerability for fraudsters to intercept, phish, or otherwise compromise the OTP value. These security concerns are amplified in high volume authentication systems designed to authenticate multiple users between multiple computing devices, such as multiple server devices and multiple user devices, at any given time.

In addition to demonstrating security vulnerabilities, existing authentication processes also intrude on user experience, such systems introduce new problems and complexities for users and administrators. For example, information technology transitions such as vendor support issues, information security transitions such as common vulnerabilities and exposure discovery, and management transitions such as leadership or policy changes all introduce complexity in securely integrating previous forms of strong authentication via MFA. These approaches also introduce an increase in user interface complexity, which causes issues such as reduced user compliance with security policy, leading to reduced authorization assurance levels.

Biometric based authentication can have implementation issues. First, the user must register their biometric information so a biometric template can be created and stored for subsequent authentication. If the registration is unattended, no user validation is performed, or the user is not endorsed, the biometric information might belong to anyone including a fraudster. Second, the user provides a real-time biometric sample for authentication where the sample and the template are "matched" yielding a score such that a low score is rejected and a high score is accepted. However, if the template storage and matching is done locally on the user device and not the host system, the authentication assurance level is low, as the host system must "trust" that the legitimate user registered their biometric information and that the user device actually preformed the matching giving a high score. Further, many biometric sensors on user devices have low precision that can allow false positives.

Systems, apparatuses, methods, and computer program products are disclosed herein for authenticating a user using a knowledge factor identification transaction with a challenge authentication token. Example implementations disclosed herein lead to improvements in the operation of networked computing devices that utilize secure communications by combining strengths of password authentication with strengths of multifactor authentication for strong authenticating, while not inherently relying on dedicated devices, biometric factors, or out-of-band communications. Example implementations combine password-based knowledge factors and one-time passwords with identity information for strong authentication.

In one example embodiment, a method is provided for requesting authentication of a user using a knowledge factor identification transaction with a challenge authentication token. The method includes providing, by communications hardware, a logon request, wherein the logon request comprises a user identifier received from a user. The method further includes receiving, by the communications hardware, a challenge sequence, wherein the challenge sequence is a random value. The method further includes generating, by authentication circuitry, a password structure, wherein the password structure is based on a static password received from the user and the challenge sequence. The method further includes generating, by the authentication circuitry, a challenge authentication token comprising the user identifier, the password structure, and a client timestamp. The method further includes providing, by the communications hardware, the challenge authentication token. The method further includes receiving, by the communications hardware, an authorization decision message, wherein the authorization decision message is indicative of whether the challenge authentication token was verified.

In another example embodiment, an apparatus is provided for requesting authentication of a user using a knowledge factor identification transaction with a challenge authentication token. The apparatus includes communications hardware configured to provide a logon request, wherein the logon request comprises a user identifier received from a user. The communications hardware is further configured to receive a challenge sequence, wherein the challenge sequence is a random value. The communications hardware is further configured to provide the challenge authentication token. The communications hardware is further configured to receive an authorization decision message, wherein the authorization decision message is indicative of whether the challenge authentication token was verified. The apparatus further includes authentication circuitry configured to generate a password structure, wherein the password structure is based on a static password received from the user and the challenge sequence. The authentication circuitry is further configured to generate a challenge authentication token comprising the user identifier, the password structure, and a client timestamp.

In another example embodiment, a computer program product is provided for requesting authentication of a user using a knowledge factor identification transaction with a challenge authentication token. The computer program product includes at least one non-transitory computer-readable storage medium storing software instructions that, when executed, cause an apparatus to provide a logon request, wherein the logon request comprises a user identifier received from a user. The at least one non-transitory computer-readable storage medium storing software instructions that, when executed, further cause an apparatus to receive a challenge sequence, wherein the challenge sequence is a random value. The at least one non-transitory computer-readable storage medium storing software instructions that, when executed, further cause an apparatus to generate a password structure, wherein the password structure is based on a static password received from the user and the challenge sequence. The at least one non-transitory computer-readable storage medium storing software instructions that, when executed, further cause an apparatus to generate a challenge authentication token comprising the user identifier, the password structure, and a client timestamp. The at least one non-transitory computer-readable storage medium storing software instructions that, when executed, further cause an apparatus to provide the challenge authentication token. The at least one non-transitory computer-readable storage medium storing software instructions that, when executed, further cause an apparatus to receive an authorization decision message, wherein the authorization decision message is indicative of whether the challenge authentication token was verified.

In another example embodiment, a method is provided for authenticating a user using a knowledge factor identification transaction with a challenge authentication token. The method includes generating, by challenge circuitry, a challenge sequence in response to receiving a logon request, wherein the logon request comprises a user identifier. The method further includes receiving, by communications hardware, a challenge authentication token in response to providing the challenge sequence, wherein the challenge authentication token comprises at least a candidate challenge sequence. The method further includes performing, by the challenge circuitry, one or more verification operations on the challenge authentication token. The method further includes providing, by the communications hardware, an authorization decision message, wherein the authorization decision message is indicative of whether the challenge authentication token was verified.

In another example embodiment, an apparatus is provided for authenticating a user using a knowledge factor identification transaction with a challenge authentication token. The apparatus includes challenge circuitry configured to generate a challenge sequence in response to receiving a logon request, wherein the logon request comprises a user identifier. The challenge circuitry is further configured to perform one or more verification operations on the challenge authentication token. The apparatus further includes communications hardware configured to receive a challenge authentication token in response to providing the challenge sequence, wherein the challenge authentication token comprises at least a candidate challenge sequence. The communications hardware is further configured to provide an authorization decision message, wherein the authorization decision message is indicative of whether the challenge authentication token was verified.

In another example embodiment, a computer program product is provided for authenticating a user using a knowledge factor identification transaction with a challenge authentication token. The computer program product includes at least one non-transitory computer-readable storage medium storing software instructions that, when executed, cause an apparatus to generate a challenge sequence in response to receiving a logon request, wherein the logon request comprises a user identifier. The at least one non-transitory computer-readable storage medium storing software instructions that, when executed, further cause an apparatus to receive a challenge authentication token in response to providing the challenge sequence, wherein the challenge authentication token comprises at least a candidate challenge sequence. The at least one non-transitory computer-readable storage medium storing software instructions that, when executed, further cause an apparatus to perform one or more verification operations on the challenge authentication token. The at least one non-transitory computer-readable storage medium storing software instructions that, when executed, further cause an apparatus to provide an authorization decision message, wherein the authorization decision message is indicative of whether the challenge authentication token was verified.

The foregoing brief summary is provided merely for purposes of summarizing some example embodiments described herein. Because the above-described embodiments are merely examples, they should not be construed to narrow the scope of this disclosure in any way. It will be appreciated that the scope of the present disclosure encompasses many potential embodiments in addition to those summarized above, some of which will be described in further detail below.

BRIEF DESCRIPTION OF THE FIGURES

FIGS. 4A-4D provide operational examples of data objects used in some example embodiments described herein.

DETAILED DESCRIPTION

Figure 1:
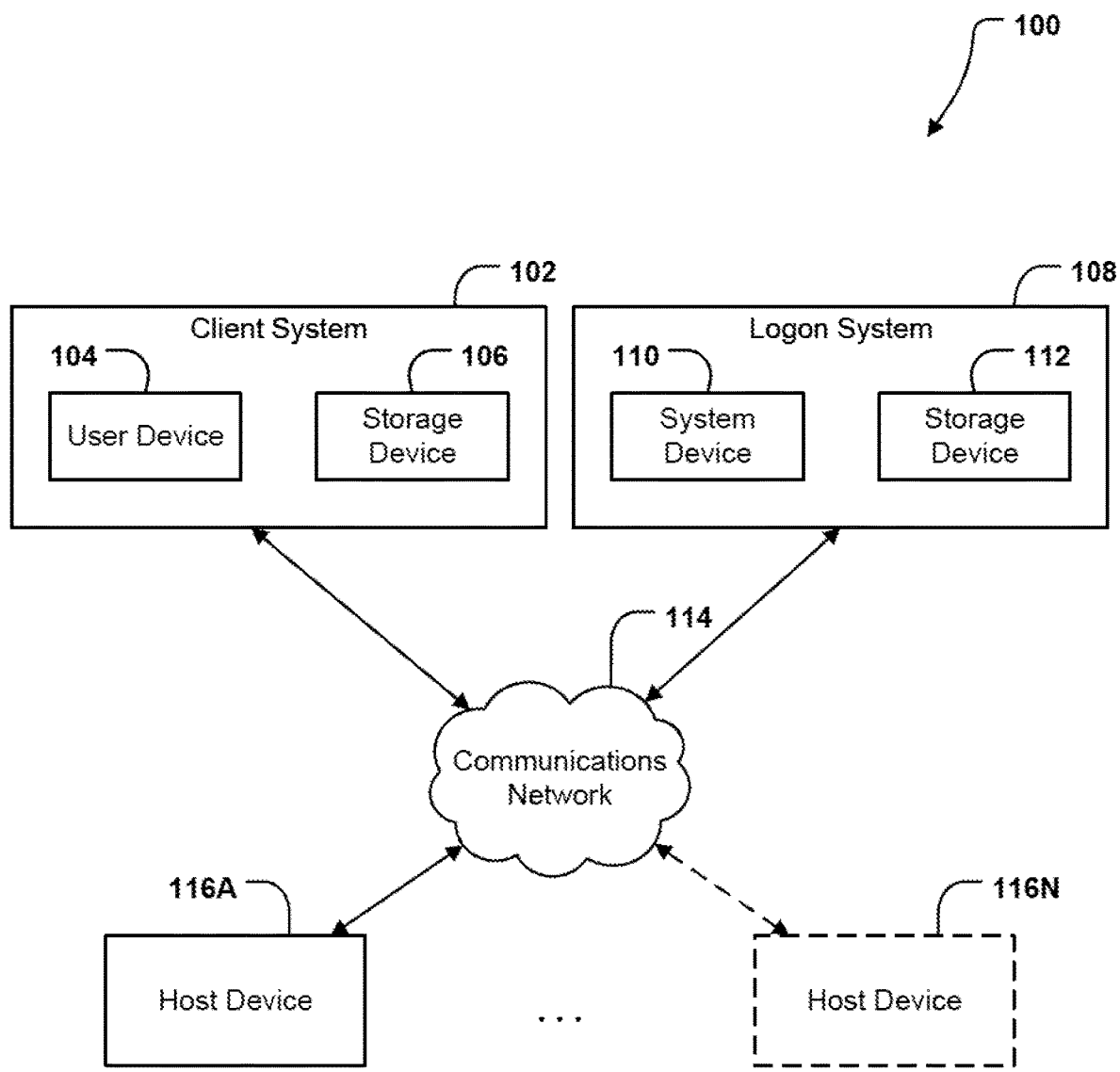
FIG. 1 illustrates a system in which some example embodiments may be used for authenticating a user using a knowledge factor identification transaction with a challenge authentication token, in accordance with some example embodiments described herein.

Some example embodiments will now be described more fully hereinafter with reference to the accompanying figures, in which some, but not necessarily all, embodiments are shown. Because inventions described herein may be embodied in many different forms, the invention should not be limited solely to the embodiments set forth herein; rather, these embodiments are provided so that this disclosure will satisfy applicable legal requirements.

Definition of Certain Terms

The terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

The term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

The word "example" is used herein to mean "serving as an example, instance, or illustration." Any implementation described herein as "example" is not necessarily to be construed as preferred or advantageous over other implementations.

The term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphones, wearable devices (such as headsets, smartwatches, or the like), and similar electronic devices equipped with at least a processor and any other physical components necessarily to perform the various operations described herein. Devices such as smartphones, laptop computers, tablet computers, and wearable devices are generally collectively referred to as mobile devices.

The term "server" or "server device" is used to refer to any computing device capable of functioning as a server, such as a master exchange server, web server, mail server, document server, or any other type of server. A server may be a dedicated computing device or a server module (e.g., an application) hosted by a computing device that causes the computing device to operate as a server. A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The terms "client device," "mobile device," "electronic device," "user device" and the like refer to computer hardware associated with the client system that is configured (either physically or by the execution of software) to communicate with the logon system to request authentication of a user and, among various other functions, is configured to directly, or indirectly, transmit and receive data. In some embodiments, the user device may be configured to provide a logon request, generate a password structure, generate a challenge authentication token, and receive an authorization decision message. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi. 3G, 4G, 5G, RFID protocols, and the like. In some embodiments, the user device may store a shared cryptographic key, which may be shared with at least the system device.

The terms "system device," "logon system device," and the like refer to computer hardware associated with the verification system that is configured (either physically or by the execution of software) to communicate with a user device and/or host device of a communication system and, among various other functions, is configured to directly, or indirectly, transmit and receive data. In some embodiments, the system device may be configured to generate a challenge sequence, and perform one or more verification operations on a received challenge authentication token. Example system devices may include a smartphone, a tablet computer, a laptop computer, a wearable device (e.g., smart glasses, smart watch, or the like), and the like. In some embodiments, a system device may include a "smart device" that is equipped with a chip or other electronic device that is configured to communicate with the apparatus via Bluetooth, NFC, Wi-Fi, 3G, 4G, 5G, RFID protocols, and the like. In some embodiments, the system device may act as a server device. In some embodiments, the system device may store one or more shared cryptographic keys, which may be shared with at least the user device.

The term "host device" and the like refer to computer hardware which is not directly associated with the verification system or client system that is configured (either physically or by the execution of software) to communicate with at least the system device of a communication system and, among various other functions, is configured to directly, or indirectly, transmit and receive data. In some embodiments, the host device may be configured to receive an access token and/or denial token and may provide the user device access to secure information in an instance an access token is received. Example host devices may include a smartphone, a tablet computer, a laptop computer, a wearable device (e.g., smart glasses, smart watch, or the like), cameras, business terminals, and the like. In some embodiments, a hose device may include a "smart device" that is equipped with a chip or other electronic device that is configured to communicate with the apparatus via Bluetooth, NFC, Wi-Fi, 3G, 4G, 5G, RFID protocols, and the like.

The term "logon request" refers to a data structure configured to begin the user authentication process. The logon request may be generated and/or provided by the user device. The logon request includes at least a user identifier associated with the user requesting authentication. In some embodiments, the logon request includes an indication of a user identifier rather than the user identifier itself. In some embodiments, the logon request may be associated with a timestamp.

The term "user identifier" refers to a data structure which is used to uniquely identify a user from other users. The user identifier may be associated with a data profile stored within a storage of a logon system. The user identifier may be used by a system device of the logon system to query the storage for the user profile. In some embodiments, if the logon request includes an indication of a user identifier, the system device may still query storage to obtain the corresponding user profile based on the indication of a user identifier. In some embodiments, the user device may receive the user identifier and/or indication of a user identifier from user input The term "challenge sequence" refers to a data structure generated by a system device of the logon system which may be used, in part, the authenticate a user. The challenge sequence may be generated based on the user identifier, a current server timestamp (e.g., a current time described by the logon system), and a random value. The random value may be generated using any suitable random number generation algorithms. In some embodiments, the random value is generate using one or more post-quantum cryptography methods for truly random number generation. For example, the random value may be generated based on encoding and decoding quantum bits (qbits) using different sets of quantum bases such that random errors are introduced into the decoded bits.

The term "static password" refers to a data structure associated with a particular user identifier. The static password may serve as one authentication factor while authenticating the user. The static password may be stored in a storage associated with the logon system. In some embodiments, the static password is stored as a hashed value within a hash table that the sensitive information is protected. A hash function may be used to generate the hashed static password. The has function may be a one-way function configured to generate hashed values. In some embodiments, the hash function may also use a salt value to when generating the hashed static password. In some embodiments, the user device may receive a static password (e.g., a candidate static password) from user input.

The term "password structure" refers to a generated data structure generated by a user device of the client system configured to describe the static password received from user input and the challenge sequence received from a system device of the logon system. In some embodiments, the password structure is formatted as the static password appended to the received challenge sequence.

The term "challenge authentication token" refers to a generated data structure generated by a user device of the client system configured to describe the user identifier, the password structure, and a client timestamp. The challenge authentication token may describe the user identifier, as received from user input. The challenge authentication token may further describe the password structure as generated by the user device, which describes the static password and the challenge sequence received from the system device of the logon system. The challenge authentication token may further describe a client timestamp, indicative of the current time associated with the user device. The challenge authentication token may be provided to a system device of the logon system for user authentication.

The term "verification operations" refers to a set of operations performed by one or more system devices on the challenge authentication token in an attempt to verify the associated user and/or user device. In some embodiments, the verification operations may include comparing a candidate user identifier with a stored user identifier, comparing a candidate challenge sequence of a candidate password structure with a stored challenge sequence, comparing a candidate static password of the candidate password structure with a stored static password, and determining whether a client timestamp is within an authentication time window defined by a server timestamp. In some embodiments, the stored information (e.g., user identifier, challenge sequence, static password, etc.) may be stored using a hash function and hash table. As such, in order to compare the provided information described by the challenge authentication token to determine whether the provided information matches stored information, the information may serve as the key and may be provided to the hash function, which may combine the information with a salt value to derive candidate hash-based information. The candidate hash-based information may be compared to the stored information entry. If the candidate hash-based information is determined to match the stored information entry, the challenge authentication token is verified. If the candidate hash-based information is not determined to match the stored information entry, the challenge authentication token is not verified. In some embodiments, if the challenge authentication token is not verified, a first verification operation may further include generating a first authentication failure alert indicative of this failure.

The first authentication failure alert may be provided to one or more user devices, host devices, and/or logon system devices The term "authentication decision message" refers to a data structure configured to describe whether the challenge authentication token was verified. In some embodiments, the authentication decision message is generated by a system device of the logon system and provided to a user device of the client system. The user device may be configured to display an indication of whether the challenge authentication token was verified and thus, whether the user was authenticated. In some embodiments, in an instance the user device receives an authentication decision message indicative that the challenge authentication token was verified, the user device may provide a request for secure information to a system device. The system device may then relay the request for secure information to a host device along with a session token.

The term "session token" refers to a data structure configured to indicate the verification status of the user, user device, and/or client system. The session token may be generated by the logon system and provided to a host device. In some embodiments, the session token is generated in response to receiving a request for secure information. In some embodiments, the session token may indicate a status of "approve" or "deny", which may indicate that the user, user device, and/or client system was verified or not verified, respectively. Based on the session token, the host device may be configured to automatically provide the requested secure data to the user device.

The term "biometric factor data" is used to refer to any of a number of measurable biological or behavioral characteristics of a user, such as fingerprints, voice patterns, iris patterns, hand geometry, facial image, and others, that may be used to uniquely distinguish users from one another. Biometric factors may be measured in the course of biometric authentication, which utilizes one or more biometric factors to establish that the claimed identity of a user is authentic. The measurement of biometric factors may extract derived data in the form of one or more biometric feature that is suitable for analysis or transmission in the course of biometric authentication.

Overview

As noted above, methods, apparatuses, systems, and computer program products are described herein that provide for access of secure information using a knowledge factor identification transaction with a challenge authentication token. Password authentication alone is disfavored in comparison with multi-factor authentication employing a plurality of discrete technologies to achieve strong authentication. Multi-factor authentication includes two or more of a knowledge factor (something you know, such as a password), a possession factor (something you have, such as a dedicated device) or an inherent factor (something you are, such as a biometric factor). Simple password authentication and multi-factor authentication approaches both have notable limitations, however. Password authentication is subject to man-in-the-middle attacks if a communication channel is insecure or compromised. Password authentication is also frequently incorrectly implemented due to confusion about correct standards, among other factors. Incorrect implementation of password authentication has led to notable high-profile data breaches causing irreparable damage. Thus even when multi-factor authentication is implemented, it still inherits these weaknesses from the use of password authentication. These considerations raise the possibility of a password-less multi-factor authentication scheme, but such a scheme also raises several concerns. The use of biometrics as one factor in a multi-factor authentication comes with privacy concerns, and security concerns about the collection of biometric data, security issues with the process of measuring biometrics on a user device, and accessibility or cost concerns around the availability of biometric measurement devices. Password authentication is thus still desirable as one factor in a multi-factor authentication scheme.

In contrast to conventional techniques for password authentication, example embodiments described herein combine a knowledge factor (a password) with a possession factor (a random value within a challenge sequence) for strong authentication.

Example embodiments provide strong authentication without reliance on other biometrics or physical devices, as well as operating in-band, without reliance on out-of-band communications such as text message or email. For example, a user device may transmit a logon request to a logon system containing a user identifier, such as a user name. The logon system may then respond with a challenge sequence containing the user identifier, a timestamp, and a random value that the logon system generates. The timestamp may be used to enforce a time limit on responses to the challenge sequence. The user device may then respond by collecting a static password from the user, and generating a challenge authentication token, a data object that contains the static password, a client timestamp, and the original challenge sequence. This data object may then be transmitted to the logon system where the logon system may authenticate the user and begin transmissions to establish a secure session, or the logon system may incorporate the challenge authentication token as one factor in a multi-factor authentication scheme. A second factor may also be incorporated into the challenge authentication token itself, for example a one-time password or possession factor data may be bundled with the other information in the challenge authentication token.

Accordingly, the present disclosure sets forth systems, methods, and apparatuses that achieve strong authentication via password authentication. There are many advantages of these and other embodiments described herein. For instance, systems where it is not possible to implement a true multi-factor authentication may achieve strong authentication by employing embodiments described herein rather than simple password authentication. For instance, legacy systems without access to biometrics may continue to operate under security policies that require strong authentication. In addition, true multi-factor authentication systems may benefit from enhanced password security of embodiments disclosed herein. As mentioned above, multi-factor authentication schemes that use a simple password authentication still inherit many of the security limitations of password authentication, so implementation of embodiments disclosed herein enable such systems to operate more effectively. Finally, embodiments disclosed herein are easier to implement and maintain than alternatives while still providing strong authentication. This means organizations are more likely to properly implement security procedures, and these security procedures are more likely to be properly maintained and transitioned through organizational changes or other unforeseen circumstances.

Although a high level explanation of the operations of example embodiments has been provided above, specific details regarding the configuration of such example embodiments are provided below.

System Architecture

Example embodiments described herein may be implemented using any of a variety of computing devices or servers. To this end, FIG. 1 illustrates an example environment 100 within which various embodiments may operate. As illustrated, a client system 102 may include a user device 104 in communication with a storage device 106. Although user device 104 and storage device 106 are described in singular form, some embodiments may utilize more than one user device 104 and/or more than one storage device 106. Additionally, some embodiments of the client system 102 may not require a storage device 106 at all.

As illustrated, a logon system 108 may include a system device 110 in communication with a storage device 112. Although system device 110 and storage device 112 are also described in singular form, some embodiments may use more than one system device 110 and/or storage device 112. Additionally, some embodiments of the logon system 108 may not require a storage device 112 at all.

Whatever the implementation, the client system 102, its constituent user device 104 and/or storage device 106, logon system 108, and its constituent system device 110 and storage device 112 may receive and/or transmit information via communications network 114 (e.g. the Internet) with any number of other devices, such as one or more of host device 116A-116N.

The client system 102 and/or the logon system 108 may be implemented as one or more servers, which may or may not be physically proximate to other components of the client system 102 and/or the logon system 108. Furthermore, some components of the user device 104 and/or the system device 110 may be physically proximate to the other components of the client system 102 and/or the logon system 108 while other components are not. The user device 104 and/or the system device 110 may receive, process, generate, and transmit data, signals, and electronic information to facilitate the operations of the client system 102 and/or the logon system 108. Particular components of user device 104 are described in greater detail below with reference to apparatus 200 in connection with FIG. 2, while particular components of system device 110 are described in greater detail below with reference to apparatus 300 in connection with FIG. 3.

The storage device 106 and/or the storage device 112 may comprise distinct components from user device 104 and/or system device 110, or may comprise elements of user device 104 and/or system device 110 (e.g., memory 204, as described below in connection with FIG. 2). The storage device 106 and/or the storage device 112 may be embodied as one or more direct-attached storage (DAS) devices (such as hard drives, solid-state drives, optical disc drives, or the like) or may alternatively comprise one or more Network Attached Storage (NAS) devices independently connected to a communications network (e.g., communications network 114). The storage device 106 and/or the storage device 112 may host the software executed to operate the client system 102 and/or the logon system 108. The storage device 106 and/or the storage device 112 may store information relied upon during operation of the client system 102 and/or the logon system 108, such as various cryptographic keys that may be used by the logon system 108, password hash databases, or the like. In addition, storage device 106 and/or the storage device 112 may store control signals, device characteristics, and access credentials enabling interaction among the client system 102, the logon system 108, and one or more of the host device 116A-116N.

The one or more host device(s) 116A-116N may be embodied by any computing devices known in the art, such as desktop or laptop computers, tablet devices, smartphones, servers or the like. The one or more host device(s) 116A-116N need not themselves be independent devices, but may be peripheral devices communicatively coupled to other computing devices.

The host device(s) 116A-116N may be distinct devices from the logon system 108, however the host device(s) 116A-116N may be embodied in the same computing device as the logon system 108. In such embodiments the user device 104 of client system 102 may gain access to secure information located on the logon system 108 rather than gaining access through the logon system 108 to a distinct host device 116A-116N.

Example Client System Implementing Apparatus

Figure 2:
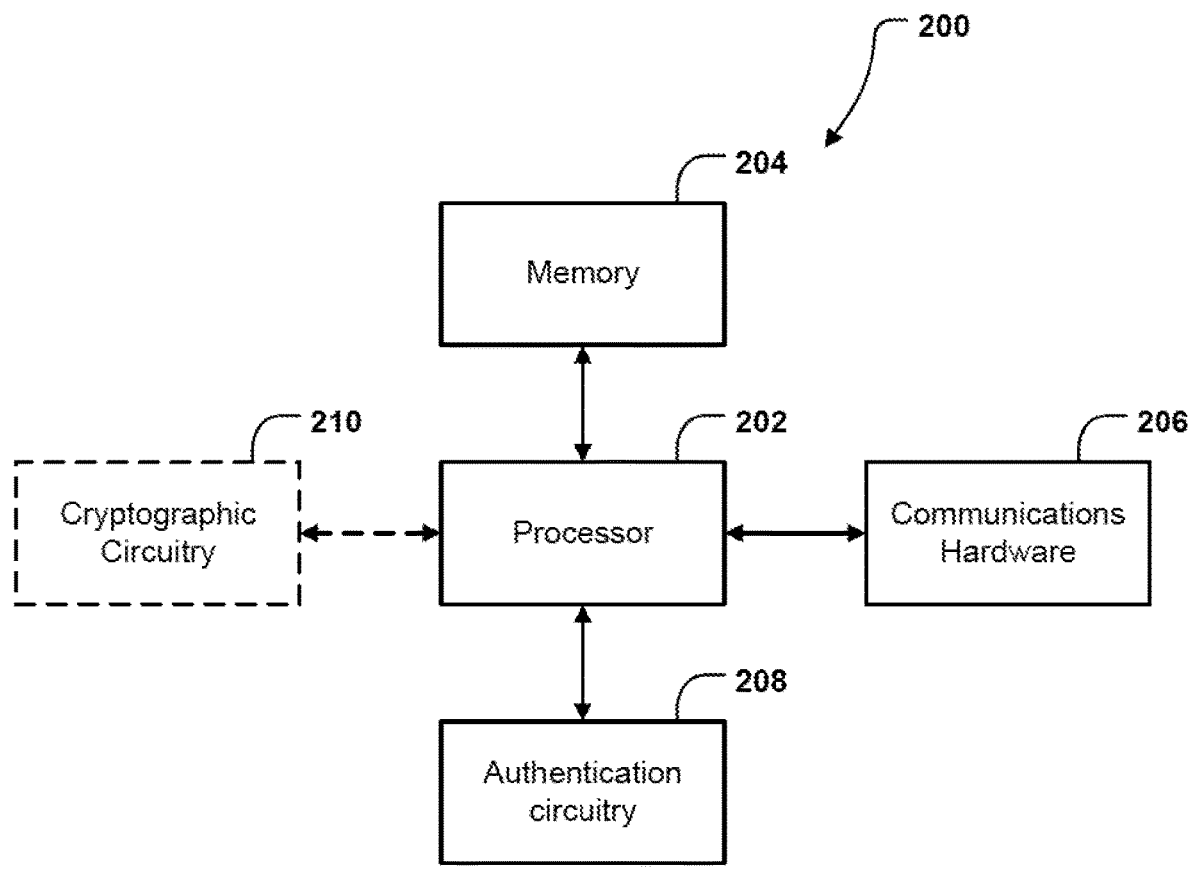
FIG. 2 illustrates a block diagram of example circuitry embodying a user device of a client system that may perform various operations in accordance with some example embodiments described herein.

The user device 104 of the client system 102 (described previously with reference to FIG. 1) may be embodied by one or more computing devices or servers, shown as apparatus 200 in FIG. 2. As illustrated in FIG. 2, the apparatus 200 may include processor 202, memory 204, communications hardware 206, authentication circuitry 208, and cryptographic circuitry 210, each of which will be described in greater detail below. While the various components are only illustrated in FIG. 2 as being connected with processor 202, it will be understood that the apparatus 200 may further comprise a bus (not expressly shown in FIG. 2) for passing information amongst any combination of the various components of the apparatus 200. The apparatus 200 may be configured to execute various operations described above in connection with FIG. 1 and below in connection FIGS. 4A-7.

The processor 202 (and/or co-processor or any other processor assisting or otherwise associated with the processor) may be in communication with the memory 204 via a bus for passing information amongst components of the apparatus. The processor 202 may be embodied in a number of different ways and may, for example, include one or more processing devices configured to perform independently. Furthermore, the processor may include one or more processors configured in tandem via a bus to enable independent execution of software instructions, pipelining, and/or multithreading. The use of the term "processor" may be understood to include a single core processor, a multi-core processor, multiple processors of the apparatus 200, remote or "cloud" processors, or any combination thereof.

The processor 202 may be configured to execute software instructions stored in the memory 204 or otherwise accessible to the processor (e.g., software instructions stored on a separate storage device 106, as illustrated in FIG. 1). In some cases, the processor may be configured to execute hard-coded functionality. As such, whether configured by hardware or software methods, or by a combination of hardware with software, the processor 202 represents an entity (e.g., physically embodied in circuitry) capable of performing operations according to various embodiments of the present invention while configured accordingly. Alternatively, as another example, when the processor 202 is embodied as an executor of software instructions, the software instructions may specifically configure the processor 202 to perform the algorithms and/or operations described herein when the software instructions are executed.

The memory 204 is non-transitory and may include, for example, one or more volatile and/or non-volatile memories. In other words, for example, the memory 204 may be an electronic storage device (e.g., a computer readable storage medium). The memory 204 may be configured to store information, data, content, applications, software instructions, or the like, for enabling the apparatus to carry out various functions in accordance with example embodiments contemplated herein.

The communications hardware 206 may be any means such as a device or circuitry embodied in either hardware or a combination of hardware and software that is configured to receive and/or transmit data from/to a network and/or any other device, circuitry, or module in communication with the apparatus 200. In this regard, the communications hardware 206 may include, for example, a network interface for enabling communications with a wired or wireless communication network. For example, the communications hardware 206 may include one or more network interface cards, antennas, buses, switches, routers, modems, and supporting hardware and/or software, or any other device suitable for enabling communications via a network. Furthermore, the communications hardware 206 may include the processing circuitry for causing transmission of such signals to a network or for handling receipt of signals received from a network.

The communications hardware 206 may be configured to provide output to a user and, in some embodiments, to receive an indication of user input. The communications hardware 206 may comprise a user interface, such as a display, and may further comprise the components that govern use of the user interface, such as a web browser, mobile application, dedicated user device, or the like. In some embodiments, the communications hardware 206 may include a keyboard, a mouse, a touch screen, touch areas, soft keys, a microphone, a speaker, and/or other input/output mechanisms. The communications hardware 206 may utilize the processor 202 to control one or more functions of one or more of these user interface elements through software instructions (e.g., application software and/or system software, such as firmware) stored on a memory (e.g., memory 204) accessible to the processor 202.

In addition, the apparatus 200 further comprises an authentication circuitry 208 that generates a challenge authentication token. The authentication circuitry 208 may utilize processor 202, memory 204, or any other hardware component included in the apparatus 200 to perform these operations, as described in connection with FIGS. 4A-7 below. The authentication circuitry 208 may further utilize communications hardware 206 to gather data from a variety of sources or to receive data from a user, and in some embodiments may utilize processor 202 and/or memory 204 to generate a challenge authentication token.

Finally, the apparatus 200 may also comprise a cryptographic circuitry 210 that encrypts or decrypts data using cryptographic keys. The cryptographic circuitry 210 may utilize processor 202, memory 204, or any other hardware component included in the apparatus 200 to perform these operations, as described in connection with FIGS. 4A-7 below. The cryptographic circuitry 210 may further utilize communications hardware 206 to gather data from a variety of sources or to receive data from a user, and in some embodiments may utilize processor 202 and/or memory 204 to encrypt or decrypt data.

Example Logon System Implementing Apparatus

Figure 3:
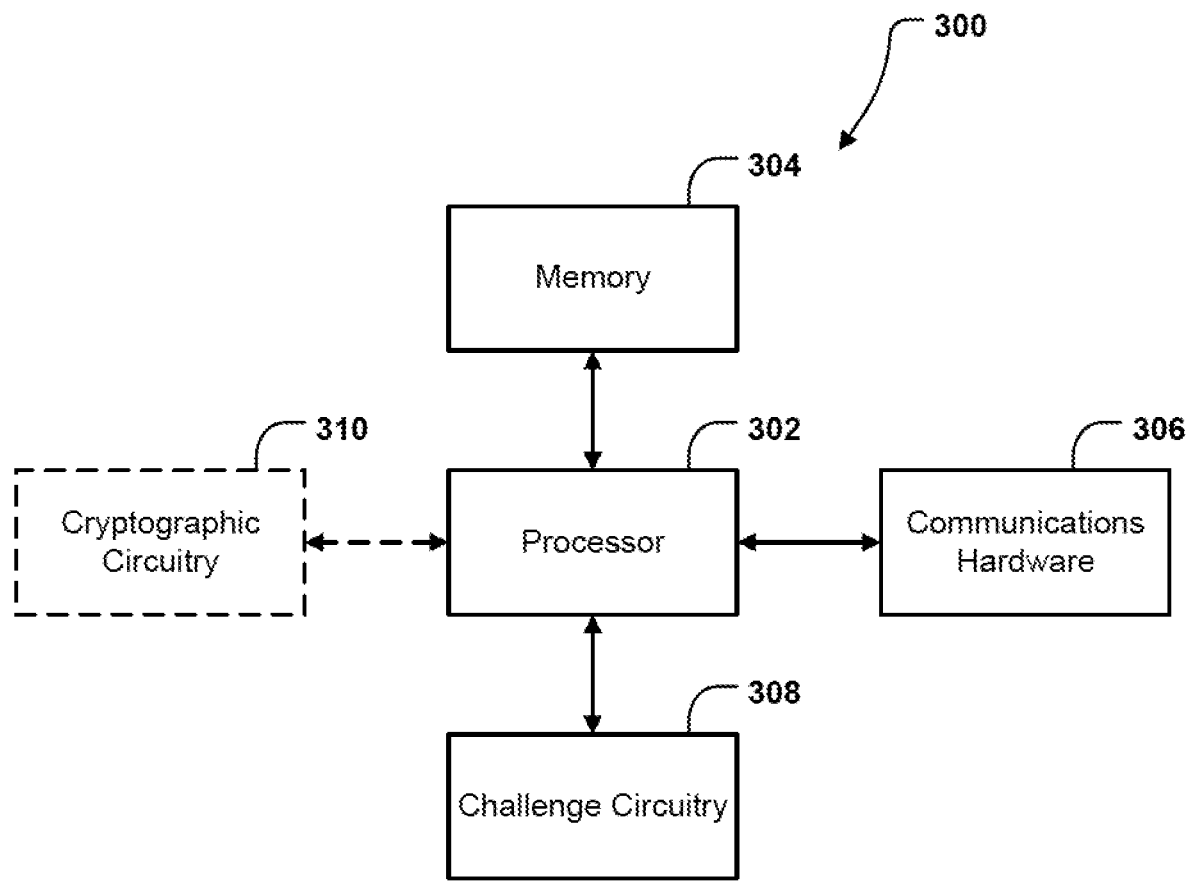
FIG. 3 illustrates a schematic block diagram of example circuitry embodying a system device of a logon system that may perform various operations in accordance with some example embodiments described herein.

As illustrated in FIG. 3, an apparatus 300 is shown that represents an example system device 110. The apparatus 300 comprises processor 302, memory 304, communications hardware 306, challenge circuitry 308 and may optionally comprise cryptographic circuitry 310, each of which is configured to be similar to the similarly named components described above in connection with FIG. 2. However, the apparatus 300 also includes challenge circuitry 308, which includes hardware components designed for generating a challenge sequence and verifying a challenge authentication token. The challenge circuitry 308 may utilize processor 302, memory 304, or any other hardware component included in the apparatus 300 to perform these operations, as described in connection with FIG. 3 below. The challenge circuitry 308 may further utilize communications hardware 306 to verify a challenge authentication token or may utilize processor 302 and/or memory 304 to generate a challenge sequence and/or verify a challenge authentication token.

Although components of FIGS. 2-3 are described in part using functional language, it will be understood that the particular implementations necessarily include the use of particular hardware. It should also be understood that certain of these components may include similar or common hardware. For example, the authentication circuitry 208 and cryptographic circuitry 210 may each at times leverage use of the processor 202, memory 204, or communications hardware 206, such that duplicate hardware is not required to facilitate operation of these physical elements of the apparatus 200 (although dedicated hardware elements may be used for any of these components in some embodiments, such as those in which enhanced parallelism may be desired). Use of the term "circuitry" with respect to elements of the apparatus therefore shall be interpreted as necessarily including the particular hardware configured to perform the functions associated with the particular element being described. Of course, while the term "circuitry" should be understood broadly to include hardware, in some embodiments, the term "circuitry" may in addition refer to software instructions that configure the hardware components of the apparatus 200 to perform the various functions described herein.

Although the authentication circuitry 208 and cryptographic circuitry 210 may leverage processor 202, memory 204, or communications hardware 206, as described above, it will be understood that any of these elements of apparatus 200 or similarly named elements of apparatus 300 may include one or more dedicated processor, specially configured field programmable gate array (FPGA), or application specific interface circuit (ASIC) to perform its corresponding functions, and may accordingly leverage processor 202 executing software stored in a memory (e.g., memory 204), memory 204, or communications hardware 206 (or similarly named elements of apparatus 300) for enabling any functions not performed by special-purpose hardware elements. In all embodiments, however, it will be understood that the authentication circuitry 208, cryptographic circuitry 210, challenge circuitry 308, and cryptographic circuitry 310 are implemented via particular machinery designed for performing the functions described herein in connection with such elements of apparatus 200 or apparatus 300.

In some embodiments, various components of the apparatus 200 and apparatus 300 may be hosted remotely (e.g., by one or more cloud servers) and thus need not physically reside on the corresponding apparatus 200 or apparatus 300. Thus, some or all of the functionality described herein may be provided by third party circuitry. For example, a given apparatus 200 or apparatus 300 may access one or more third party circuitries via any sort of networked connection that facilitates transmission of data and electronic information between the apparatus 200 or apparatus 300 and the third party circuitries. In turn, that apparatus 200 or apparatus 300 may be in remote communication with one or more of the other components described above as comprising the apparatus 200 or apparatus 300.

As will be appreciated based on this disclosure, example embodiments contemplated herein may be implemented by an apparatus 200 or apparatus 300. Furthermore, some example embodiments may take the form of a computer program product comprising software instructions stored on at least one non-transitory computer-readable storage medium (e.g., memory 204). Any suitable non-transitory computer-readable storage medium may be utilized in such embodiments, some examples of which are non-transitory hard disks, CD-ROMs, flash memory, optical storage devices, and magnetic storage devices. It should be appreciated, with respect to certain devices embodied by apparatus 200 as described in FIG. 2 or apparatus 300 as described in FIG. 3, that loading the software instructions onto a computing device or apparatus produces a special-purpose machine comprising the means for implementing various functions described herein.

Having described specific components of example apparatus 200 and example apparatus 300, example embodiments are described below in connection with a series of diagrams and flowcharts.

Example Client System Operations

Figure 5:
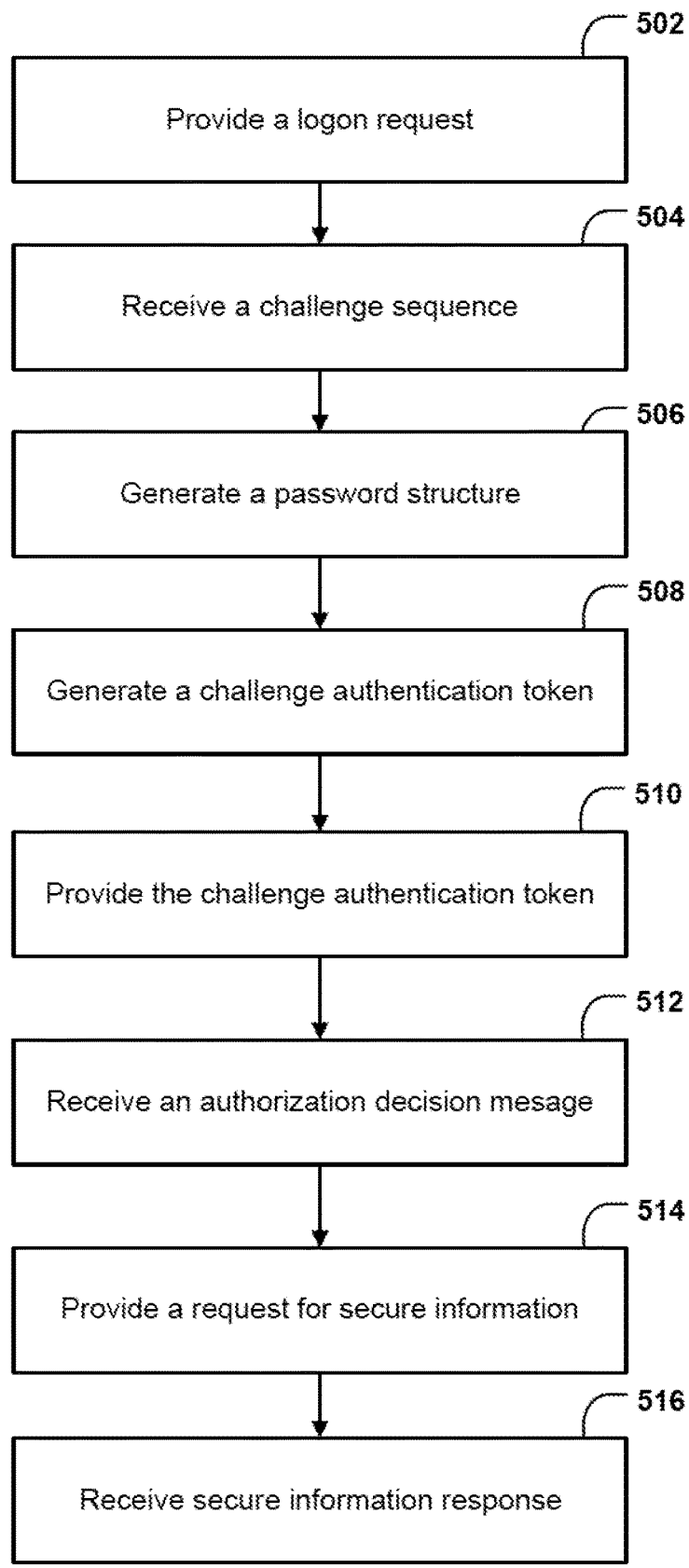
FIG. 5 illustrates an example flowchart for requesting authentication for a user using a knowledge factor identification transaction with a challenge authentication token, in accordance with some example embodiments described herein.

Turning to FIG. 5, example flowcharts are illustrated that contain example operations implemented by example embodiments described herein. The operations illustrated in FIG. 5 may, for example, be performed by user device 104 of the client system 102 shown in FIG. 1, which may in turn be embodied by an apparatus 200, which is in turn described in connection with FIG. 2. To perform the operations described below, the apparatus 200 may utilize one or more of processor 202, memory 204, communications hardware 206, authentication circuitry 208, cryptographic circuitry 210, and/or any combination thereof.

Turning first to FIG. 5, example operations are shown for requesting authentication of a user using a knowledge factor identification transaction with a challenge authentication token. As shown by operation 502, the apparatus 200 includes means, such as processor 202, memory 204, communications hardware 206, or the like, for providing a logon request. In some embodiments, the logon request includes a user identifier as received from the user and corresponds to a user requesting authentication. The communications hardware 206 may obtain a user identifier by receiving user input by a keyboard, touchscreen, or other input device. In some embodiments, a static password may also be obtained with the user identifier. In such an instance, the static password may be stored in an associated memory, such as memory 204, but not included in the logon request. The user identifier may uniquely identify the user such that the user identity is selectable from a user profile database associated and/or accessible to a logon system 108. For example, the user identifier may include a username chosen by the user, a user number assigned by the system administrator, a user's full name, a user email address, etc. In some embodiments, the logon request may be associated with a timestamp.

In some embodiments, the logon request includes an indication of a user identifier rather than the user identifier itself. For example, the logon system may include a device identifier, which is associated with a particular user profile within the user profile database. As such, the logon system may be provided with information required to determine the associated user profile and determine the user identifier based on the indication of a user identifier described by the logon request.

The communications hardware 206 may be configured to structure and/or format the logon request prior to providing it to a system device 110 of the logon system 108. For example, in some embodiments, cryptographic circuitry 210 may be configured to encrypt the logon request and/or user identifier using one or more encryption techniques, such as Advanced Encryption Standard (AES), using a pre-shared and/or dynamically allocated encryption key which is shared and/or known to the logon system 108 and/or system device 110. As another example, the cryptographic circuitry may use one or more public key encryption algorithms or post-quantum cryptography (PQC) algorithms to encrypt the logon request and/or contents of the logon request. Once formatted, the communications hardware 206 may provide the logon request to a system device 110 of the logon system 108.

FIG. 4A illustrates an operational example of the structure of a logon request 402. As shown by FIG. 4A, the logon request 402 includes a user identifier 404.

Returning now to FIG. 5, operation 504 shows, the apparatus 200 may include means, such as processor 202, memory 204, cryptographic circuitry 210, or the like, for receiving a challenge sequence. The apparatus 200 may receive the challenge sequence from the system device 110 in response to providing the logon request as described in operation 502. The challenge sequence may be a random number.

In some embodiments, the challenge sequence may received as encrypted. As such, the cryptographic circuitry 210 may decrypt the challenge sequence in accordance with the encryption scheme used by the system device 110. The challenge sequence may be formatted such that the apparatus 200 may determine the one or more encryption methods used to encrypt the challenge sequence. For example, the challenge sequence may include a header indicative of each encryption algorithm used to encrypt the challenge sequence. As such, the cryptographic circuitry 210 may select the appropriate decryption algorithm to decrypt the challenge sequence.

In some embodiments, the challenge sequence is encrypted based on a pair of asymmetric keys, including a private key and a public key, associated with the apparatus 200. In particular, the challenge sequence may be encrypted based on a public key of the pair of asymmetric keys such that the cryptographic circuitry 210 may decrypt the challenge sequence using the corresponding private key. The private key may be retrieved from memory 204 or other storage, where it may be additionally protected with a passphrase or other means. The asymmetric cryptography scheme may allow the holder of a private key to execute an algorithm that may decrypt an encrypted message. The cryptographic circuitry 210 may apply the private key to the encrypted challenge sequence to produce a decrypted challenge sequence. The decrypted challenge sequence may be subsequently processed. In this example implementation, the challenge sequence may remain secure even if intercepted by a third party, because the private key is kept secret and secure from fraudsters and the encrypted challenge sequence cannot be decrypted within the private key.

As shown by operation 506, the apparatus 200 includes means, such as processor 202, memory 204, communications hardware 206, authentication circuitry 208 or the like, for generating a password structure. In some embodiments, the authentication circuitry 208 may generate a password structure based on a static password and the challenge sequence. In particular, the authentication circuitry 208 may append the static password to the challenge sequence to generate the password structure.

In some embodiments, the communications hardware 206 may receive the user identifier and the static password associated with the user identifier from user input. The communications hardware 206 may store the user identifier and the static password associated with the user identifier, for example in memory 204 or another storage device. In these embodiments, obtaining the static password associated with the user identifier in response to the challenge sequence utilizes the static password associated with the user identifier received from user input. The communications hardware 206 may obtain the user identifier and the static password together by keyboard input, touchscreen, or other input methods. The user identifier may be utilized in operation 502 while the user identifier and static password are stored. The processor 202 may obtain the static password in response to the challenge sequence, utilizing the static password received from user input. The identifier may be obtained together with the static password, and they may be obtained from memory 204 or other storage. In these embodiments, the user identifier and static password may be obtained simultaneously from user input, for example using a graphical user interface that prompts the user for both. The memory 204 may hold the static password while waiting for the challenge sequence from the logon system 108. Once the challenge sequence is received, the static password may be deployed without requiring interaction with the user.

The cryptographic circuitry 210 may protect the password structure by utilizing a form of hashing, encryption, or other method to obfuscate the contents of the password structure to a potential attacker, and this obfuscation may encapsulate the entire password structure, or one or more components contained therein. For example, the cryptographic circuitry may use one or more public key encryption algorithms or post-quantum cryptography (PQC) algorithms to encrypt the password structure.

FIG. 4C depicts an operational example of a password structure 442. In particular, the password structure 442 is shown to include the challenge sequence 444 and the static password 452.

Returning now to FIG. 5, as shown by operation 508, the apparatus 200 includes means, such as processor 202, communications hardware 206, authentication circuitry 208, or the like, for generating a challenge authentication token. The challenge authentication token may include the user identifier, the password structure, and a client timestamp. The authentication circuitry 208 may record a client timestamp at the time the challenge authentication token is generated. The authentication circuitry 208 may generate the challenge authentication token by bundling the user identifier, password structure (e.g., including the challenge sequence and static password), and client timestamp together in a pre-determined data structure.

In some embodiments, cryptographic circuitry 210 may protect the challenge authentication token by utilizing a form of hashing, encryption, or other method to obfuscate the contents of the challenge authentication token to a potential attacker, and this obfuscation may either encapsulate the entire token, or one or more components contained therein. In particular, the cryptographic circuitry 210 may encrypt the challenge authentication token using a shared cryptographic key which is shared and/or known to the logon system 108 and/or system device 110. The cryptographic circuitry 210 may use one or more public key encryption algorithms or post-quantum cryptography (PQC) algorithms to encrypt the challenge authentication token. In some embodiments, the cryptographic circuitry 210 may encrypt the challenge authentication token using a public key associated with a pair of asymmetric keys which is associated with logon system 108 and/or system device 110.

In some embodiments, the challenge authentication token may further comprise biometric factor data, a second password structure, and/or device data. Such data may be transmitted as part of a multi-factor authentication scheme, where the knowledge factor identification transaction with a challenge authentication token may supply one factor, and one or more of the pieces of transmitted data given above may supply additional factors.

Biometric factor data may describe data derived from biometric data associated with the user. Biometric factor data may provide a form of biometric authentication. The biometric factor data may include one or more of data from a fingerprint scan, a retinal scan, facial recognition, voice recognition, or any other factor derived from user biometrics. Data obtained from a biometric scan of the user may be processed, and one or more features of the full biometric scan may be included as biometric factor data rather than the full biometric scan data, both for security purposes and efficiency of data transmission.

A second password structure may be transmitted to provide another authentication factor. The second password structure may be a one-time password, used to provide additional security with the first static password associated with the user identifier. A one-time password may be generated or selected at the time of logon by the logon system 108, then transmitted with an out-of-band communication method, such as a dedicated device, mobile phone, or the like. The user may then input the second password structure, which may be hashed or encrypted for additional security.

Device data may be data produced by apparatus 200 and/or device associated with the user to provide a possession-based authentication factor. A dedicated device may be distributed to the user prior to the logon request, which is associated to that user in a database of dedicated device information. The dedicated device may produce device data which may be transmitted by the user, or automatically transmitted through circuitry of the dedicated device and/or client system 102. The device data from the dedicated device may further be based on the current time, a secret key, or other factors known to the logon system 108. The device data may be encrypted or hashed for further security.

In some embodiments, the challenge authentication token may exclude any biometric factor data of the user. The challenge authentication token may comprise other data, such as authentication data from additional authentication factor as the gathering and provision of data derived from biometric factors may present significant costs and organizational barriers barring implementation. Additionally, verification of biometric factors may present a privacy risk or may be legally prohibited in certain jurisdictions, motivating its exclusion from the challenge authentication token.

In some embodiments, the challenge authentication token may comprise the user identifier, the static password associated with the user identifier, the challenge sequence, and the client timestamp. In these embodiments the data object structure of the challenge sequence may be embedded in the challenge authentication token. In some embodiments, the challenge authentication token may comprise the user identifier, the password structure, and the client timestamp. In these embodiments, the authentication circuitry 208 may generate the challenge authentication token by bundling the constituent data together in a pre-determined data structure. The authentication circuitry 208 may protect the challenge authentication token by utilizing a form of hashing, encryption, or other method to obfuscate the contents of the password structure to a potential attacker, and this obfuscation may encapsulate the entire password structure, or one or more components contained therein.

FIG. 4D depicts an operational example of a challenge authentication token 462. As shown in FIG. 4D, the challenge authentication token 462 includes the user identifier 464, the password structure 466, and the client timestamp 478. The structure of password structure 466 can further be broken down to include the challenge sequence 468 and static password 476.

Returning now to FIG. 5, as shown by operation 510, the apparatus 200 includes means, such as processor 202, communications hardware 206, or the like, for providing the challenge authentication token. The challenge authentication token may be provided to system device 110 and/or to the logon system 108. The communications hardware 206 may provide the challenge authentication token to the same system device 110 that sent the challenge sequence previously. The transmission may be secured be a previously-established secure communications protocol, and may use the same configuration established in operation 502.

In some embodiments, the apparatus 200 may include means, such as cryptographic circuitry 210, or the like, for encrypting the logon request, the static password, the password structure and/or the challenge authentication token. The encryption may proceed by utilizing a public cryptographic key in an asymmetric cryptography scheme. The public cryptographic key may correspond to a private cryptographic key known to the logon system 108. The method of encrypting the data may use any number of encryption schemes compatible with the asymmetric cryptography scheme known to the client system 102 and logon system 108. In some embodiments, the cryptographic circuitry 210 may begin encryption by translating the plaintext form of the data into a numerical representation, subject to various restrictions on the numbers allowed. The cryptographic circuitry 210 may then transform the numerical representation of the plaintext according to some values of the public key. In some embodiments, the cryptographic circuitry 210 may further include an indication of which encryption schemes were used to encrypt the logon request, the static password, the password structure and/or the challenge authentication token such that system device 110 may select the appropriate decryption method.

In some embodiments, the communications hardware 206 may obtain a shared cryptographic key, where the shared cryptographic key is known to the logon system 108. In these embodiments, transmitting the logon request is secured by encrypting the logon request with the shared cryptographic key, and transmitting the challenge authentication token is secured by encrypting the challenge authentication token with the shared cryptographic key. The cryptographic circuitry 210 may secure these transmissions by encrypting their contents with a symmetric key encryption scheme. The communications hardware 206 may obtain the shared cryptographic key prior to the initiation of the logon request, and may retrieve it from memory 204 or other storage for encryption and decryption. In some embodiments, the cryptographic circuitry 210 may encrypt content by translating plaintext messages into a numerical representation and breaking the numerical representation into blocks of a pre-determined size. The blocks may then be encrypted according to a chosen symmetric key encryption algorithm known to the logon system 108, concatenated together and transmitted to the logon system 108. The reverse operation may be applied for decryption of encrypted messages received from logon system 108. In the event of the receipt of an encrypted transmission from logon system 108, the same shared cryptographic key may be used for decryption. In these embodiments, transmissions may be secured even if intercepted and read by a potential attacker, assuming the shared cryptographic key is secret.

As shown by operation 512, the apparatus 200 includes means, such as processor 202, communications hardware 206, or the like, for receiving an authentication decision message. The authentication decision message may be indicative of whether the challenge authentication token was verified by the system device 110 and/or logon system 108. In some embodiments, the apparatus 200 may be configured to display an indication of whether the challenge authentication token was verified and thus, whether the user was authenticated. In some embodiments, in an instance the user device receives an authentication decision message indicative that the challenge authentication token was verified, the apparatus 200 may provide a request for secure information to the system device 110.

In some embodiments, the authorization decision message may include a user session token configured to allow for secure, authenticated communication between the apparatus 200 and logon system 108 and/or another host device 116A-116N for a pre-determined duration. The user session token may contain certain information about the user, the apparatus 200, the duration of time allowed for the session, or other information. The apparatus 200 may occasionally transmit the session token to authenticate transmissions with the logon system 108 or host device 116A-116N. The user session token may be stored by memory 204 or other storage, and may further be used by the processor 202 to display information about the current session to the user, such as logon credentials. For example, the user session token may permit a website to render with a profile image and user identifier indicating to the user that an authenticated session is taking place.

In some embodiments, the communications hardware 206 may transmit one or more additional authentication tokens. The additional authentication token comprises biometric factor data, a second password structure known by the user via out-of-band communication, and/or device data. In these embodiments, additional tokens may be transmitted to provide additional factors in a multi-factor authentication scheme. The authentication factors given here are described in more detail above. The transmission of additional factors may occur simultaneously with the challenge authentication token, or may be transmitted at an earlier or later time. In these embodiments, the apparatus 200 may wait for an indication of challenge authentication token verification, further indicative of user authentication, to obtain secure information until all authentication factors are transmitted and validated by logon system 108.

As shown by operation 512, the apparatus 200 includes means, such as processor 202, memory 204, communications hardware 206, or the like, for providing a request for secure information. The request for secure information may be provided to the system device 110 and/or logon system 108. The request for secure information may indicate one or more files, data, or other resources that are accessible through host device 116A-116N. The request for secure information may further include a uniform resource locator (URL), a network address, a pointer to a file in a filesystem, and/or the like. The communications hardware 206 may indicate properties such as a time duration for which the request for secure information will remain valid. The memory 204 or other storage may also queried to ascertain if sufficient storage resources are available if the secure information is to be stored locally as part of the request.

In some embodiments, the request for secure information may be provided directly to the host device 116A-116N. In some embodiments, the apparatus 200 may assume that a session token has been passed to the host device 116A-116N, and may transmit the request for secure information directly without further use of the logon system 108 as intermediary.

As shown by operation 516, the apparatus 200 includes means, such as processor 202, memory 204, communications hardware 206, or the like, for receiving a secure information response. The secure information response may be received from the host device 116A-116N. In some embodiments, the secure information response may be secured using a previously exchanged session key for symmetric key encryption between the apparatus 200 and the host device 116A-116N, or other forms of secure transmission may be used. The communications hardware 206 may in some embodiments transmit the user session token to indicate the verified status of the user and apparatus 200. The secure information may take the form of a single transmission, or may comprise a series of transmission between the apparatus 200 and host device 116A-116N. The host device 116A-116N may in fact be the same device or part of the system of logon system 108, or host device 116A-116N may be a distinct device. The host device 116A-116N may be a single device or a plurality of host devices 116A-116N.

Example Logon System Operations

Figure 6:
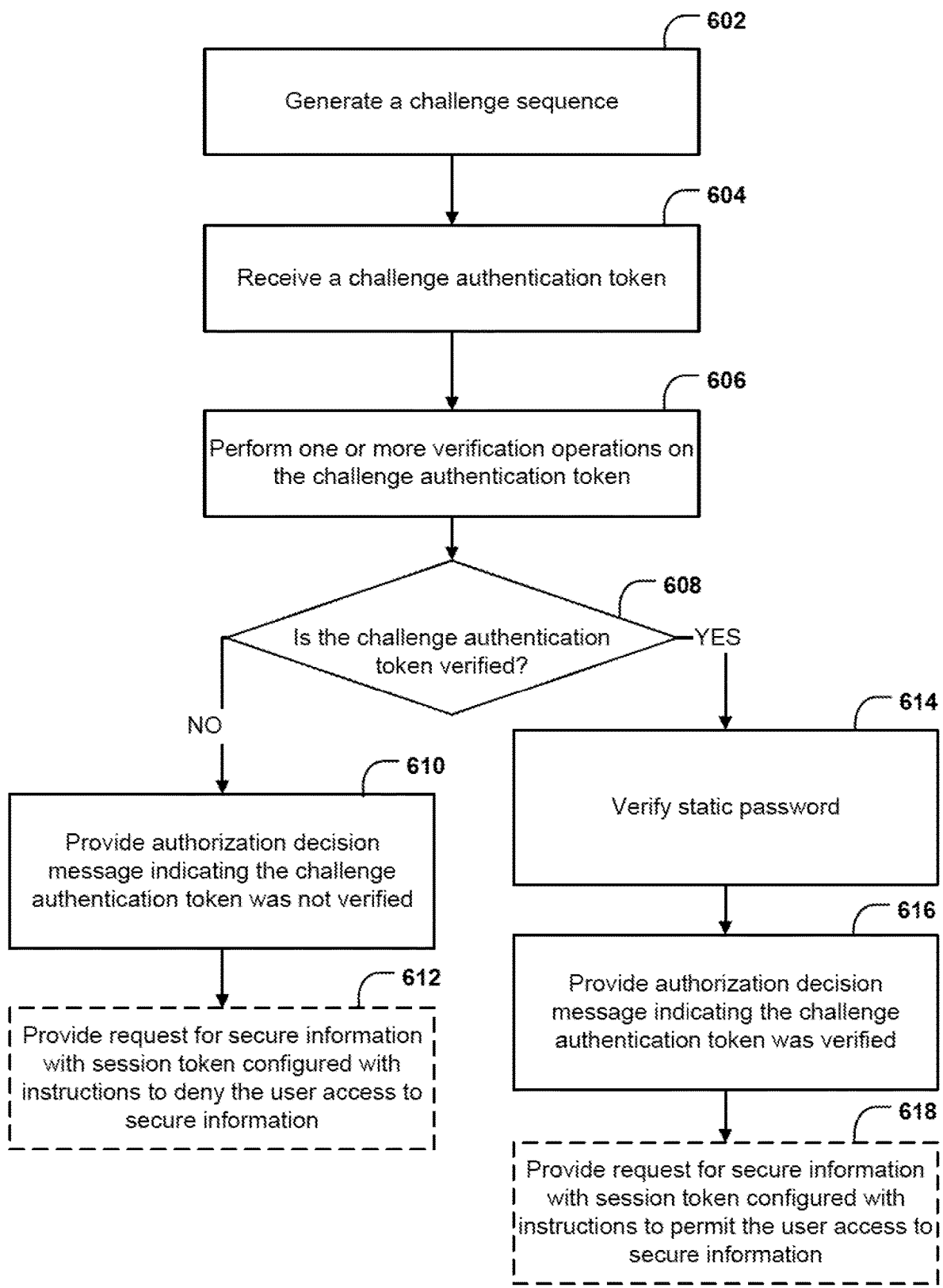
FIG. 6 illustrates an example flowchart for authenticating a user using a knowledge factor identification transaction with a challenge authentication token, in accordance with some example embodiments described herein.

Turning next to FIG. 6, example operations are shown for authorizing transmission of secure information to a client system 102 using a knowledge factor identification transaction with a challenge authentication token. The operations illustrated in FIG. 6 may, for example, be performed by system device 110 of the logon system 108 shown in FIG. 1, which may be performed by the apparatus 300, which may in turn utilize one or more of processor 302, memory 304, communications hardware 306, challenge circuitry 308, cryptographic circuitry 310, and/or any combination thereof.

As shown by operation 602, the apparatus 300 includes means, such as processor 302, challenge circuitry 308, or the like, for generating a challenge sequence. In some embodiments, the challenge circuitry 308 may generate the challenge sequence in response to receiving a logon request from a user device 104. The logon request may include a user identifier. In some embodiments, the logon request includes an indication of a user identifier. The challenge circuitry 308 may be configured to query a user profile database, which may be stored in memory 304, to identify a user identifier associated with the indication of a user identifier.

The challenge circuitry may generate the challenge sequence based on the user identifier, a random value, and a server timestamp. The random value may take the form of a number, string, or any other data type, and it may be a truly random number, pseudo-random, or generated in any other way such that the random value is unpredictable to a potential attacker. For example, for a truly random number generation, the random value may be generated based on encoding and decoding quantum bits (qbits) using different sets of quantum bases such that random errors are introduced into the decoded bits.

The challenge circuitry 308 may also record a server timestamp to use when generating the challenge sequence. The server timestamp may indicate a time-to-live and define an authentication time window for which the user device 104 is required to provide a challenge authentication token within in order for the challenge authentication token to be verified. For example, the server timestamp may comprise the current time when the apparatus 300 executes the generation of the challenge sequence, or the current time when the logon request is received and the authentication time window may be defined as 120 seconds from that current time. The challenge circuitry 308 may generate the challenge sequence by bundling the random value, the server timestamp, and the user identifier together. The challenge sequence may be protected by utilizing a form of hashing, encryption, or other method to obfuscate the contents of the challenge sequence to a potential attacker, and this obfuscation may either encapsulate the entire sequence, or one or more components contained therein.

In some embodiments, the apparatus 300 may include means, such as cryptographic circuitry 310, or the like, for encrypting the challenge sequence by utilizing a public cryptographic key in an asymmetric cryptography scheme. The encryption may proceed by utilizing a public cryptographic key in an asymmetric cryptography scheme. The public cryptographic key may correspond to a private cryptographic key known to the client system 102, user device 104, or another host device 116A-116N. The method of encrypting the data may use any number of encryption schemes compatible with the asymmetric cryptography scheme known to the apparatus 300 as well as the client system 102 or another host device 116A-116N. In some embodiments, the cryptographic circuitry 310 may begin encryption by translating the plaintext form of the data into a numerical representation, subject to various restrictions on the numbers allowed. The cryptographic circuitry 310 may then transform the numerical representation of the plaintext according to some values of the public key.

In some embodiments, the communications hardware 306 may obtain a shared cryptographic key, where the shared cryptographic key is known to the client system 102, and providing the challenge sequence is secured by the shared cryptographic key. In these embodiments, providing the challenge sequence is secured by utilizing the shared cryptographic key. The cryptographic circuitry 310 may secure these transmissions by encrypting their contents with a symmetric key encryption scheme. The shared cryptographic key may be obtained prior to the initiation of the logon request, and retrieved from memory 304 or other storage for encryption and decryption. In some embodiments, the cryptographic circuitry 310 may encrypt content by translating plaintext messages into a numerical representation, and breaking the numerical representation into blocks of a pre-determined size. The blocks may then be encrypted according to a chosen symmetric key encryption algorithm known to the user device 104, concatenated together and provided to the user device 104.

FIG. 4B depicts an operational example of the challenge sequence 422. The challenge sequence 422 includes the user identifier 424, the random value 426, and the server timestamp 428.

As shown by operation 604, the apparatus 300 includes means, such as processor 302, communications hardware 306, or the like, for receiving a challenge authentication token. The challenge authentication token may be received from a user device 104 and/or client system 102. The challenge authentication token may be received in response to providing the challenge sequence to the user device 104. The challenge authentication token may include a candidate user identifier, a candidate password structure, a candidate challenge sequence, a candidate static password, and a client timestamp.

In some embodiments, the challenge authentication token, and/or contents of the challenge authentication token may be encrypted using one or more encryption schemes. In some embodiments, the challenge authentication token may indicate the type of encryption scheme(s) used to encrypt the challenge authentication token. As such, the cryptographic circuitry 310 may decrypt the challenge authentication and/or content of the challenge authentication token using the corresponding decryption scheme. The challenge authentication token may then be unbundled into its constituent parts, as listed above. The challenge circuitry 308 may then make a determination of the validity of the constituent parts, using the results of these determinations to determine the validity of the combined challenge authentication token. Example methods for determining the validity of constituent parts are described below.

As shown by operation 606, the apparatus 300 includes means, such as processor 303, communications hardware 306, challenge circuitry 308, or the like, for performing one or more verification operations on the challenge authentication token. In some embodiments, the verification operations may include comparing a candidate user identifier with a stored user identifier, comparing a candidate challenge sequence of a candidate password structure with a stored challenge sequence, comparing a candidate static password of the candidate password structure with a stored static password, and determining whether a client timestamp is within an authentication time window defined by a server timestamp.

In some embodiments, the stored information (e.g., user identifier, challenge sequence, static password, etc.) may be stored using a hash function and hash table. As such, in order to compare the provided information described by the challenge authentication token to determine whether the provided information matches stored information, the information may serve as the key and may be provided to the hash function, which may combine the information with a salt value to derive candidate hash-based information. The candidate hash-based information may be compared to the stored information entry. If the candidate hash-based information is determined to match the stored information entry, the challenge authentication token is verified. If the candidate hash-based information is not determined to match the stored information entry, the challenge authentication token is not verified.

In particular, the challenge circuitry 308 may compute a cryptographic hash value from the candidate static password. The cryptographic hash value may be a one-way function such that it is relatively easy to compute the hash of a given value, but prohibitively difficult to compute the value given a hash value. In some embodiments, the candidate static password may be combined with a value known as a salt, and the hash of the candidate static password combined with one or more salts may be computed. The candidate static password hash value may be compared to an entry from a database of static password hash data. The database may be retrieved from memory 304 or other storage. The hash value corresponding to the user identifier from the challenge authentication token may be retrieved from the database of static password hash data, and the two hash values may be compared to confirm the validity of the static password associated with the user identifier. If the hash values match, the challenge circuitry 308 may infer a valid static password was provided by the user, but if the hash values do not match, the challenge circuitry 308 may infer that an invalid static password was provided and reject the challenge authentication token.

Challenge circuitry 308 may determine the validity of the client timestamp from the challenge authentication token by determining if the client timestamp falls within a predetermined time window of the server timestamp. The challenge circuitry 308 may make a comparison of the client timestamp and the server timestamp, evaluating the time difference between the two timestamps. The authentication time window may be specified when the challenge circuitry 308 is configured, allowing shorter or longer time windows depending on the security needs of the system. The challenge circuitry 308 may compare the time difference between the two timestamps with the authentication time window of time. If the time difference between the two timestamps is less than the authentication time window, the challenge circuitry 308 may infer the client timestamp is valid. If the difference between the two timestamps is greater than the authentication time window, the challenge circuitry 308 may infer that the client timestamp is invalid and reject the challenge authentication token.

Challenge circuitry 308 may determine the validity of an the candidate random value from the challenge authentication token by comparing the candidate to the random value from the challenge sequence. The challenge circuitry 308 may retrieve the previously generated random value from memory 304 or other storage. The challenge circuitry 308 may compare the previously generated random value with the candidate random value, and determine if there is an exact match. If an exact match is found, the challenge circuitry 308 may infer that the candidate random value from the challenge authentication token is a genuine copy and thus valid. If an exact match is not found, challenge circuitry 308 may infer that the candidate random value is invalid and reject the challenge authentication token.

Challenge circuitry 308 may determine the validity of the candidate user identifier from the challenge authentication token by comparing the candidate user identifier from the challenge authentication token to the user identifier from the challenge sequence. The challenge circuitry 308 may retrieve the previously obtained user identifier from the challenge sequence by accessing memory 304 or other storage. The challenge circuitry 308 may compare the previously obtained user identifier with the candidate user identifier from the challenge authentication token, and determine if there is an exact match. If an exact match is found, the challenge circuitry 308 may infer that the candidate user identifier from the challenge authentication token is valid. If an exact match is not found, challenge circuitry 308 may infer that the candidate user identifier is invalid and reject the challenge authentication token.

In some embodiments, the apparatus 300 may include means, such as cryptographic circuitry 310, or the like, for decrypting the logon request, the static password associated with the user identifier, the challenge authentication token, or a combination thereof by utilizing a private cryptographic key in an asymmetric cryptography scheme. The private key may be retrieved from memory 304 or other storage, where it may be additionally protected with a passphrase or other means. The asymmetric cryptography scheme may allow the holder of a private key to execute an algorithm that may decrypt an encrypted message. The cryptographic circuitry 310 may apply the private key to the encrypted challenge sequence to produce a decrypted challenge sequence. The decrypted challenge sequence may then be read, and the logon system 108 may formulate a response to the decrypted challenge sequence. In this example implementation, the challenge sequence may remain secure even if intercepted by a third party, assuming the private key is kept secret and the encryption of the asymmetric cryptography scheme cannot be broken.

As shown by operation 608, the apparatus 300 includes means, such as processor 303, communications hardware 306, challenge circuitry 308, or the like, for determining whether the authentication token is verified. The authentication token is considered valid if the one or more verification operations are verified. If the challenge authentication token is verified, the process proceeds to operation 614. If the challenge authentication token is not verified, the process proceeds to operation 610.

As described above, in an instance the challenge authentication token is not verified, the process proceeds to operation 610. At operation 610, the apparatus 300 includes means, such as processor 303, communications hardware 306, challenge circuitry 308, or the like, for providing an authorization message indicating the challenge authentication token was not verified. The authorization message may be provided to the user device 104 and/or client system 102. The authorization message may further indicate a reason for the denial of access, such as an invalid password, an expired timestamp, or other reasons. The message may include instructions configured to initiate another logon attempt on the user device 104, up to a pre-determined number of attempts within a time window.

At operation 612, the apparatus 300 includes means, such as processor 303, communications hardware 306, or the like, for providing a request for secure information with a session authentication token configured with instructions to deny the user access to secure information. In some embodiments, the apparatus 300 may receive a request for secure information from user device 104. In an instance the challenge authentication token was not verified, the apparatus 300 may forward the request for secure information with a session token indicating the challenge authentication was not verified and/or instructions to deny the user access to secure information to host device 116A-116N. As such, this prevents host device 116A-116N from allowing user device 104 access to secure information since the challenge authentication token was not verified, thereby preventing potential fraudsters from accessing private and sensitive data.

As described above, in an instance the challenge authentication token is verified, the process proceeds to operation 614. At operation 614, the apparatus 300 includes means, such as processor 303, communications hardware 306, challenge circuitry 308, or the like, for verifying the authentication factor encapsulated in the password structure. The authentication factor may be the static password. The processor 303 may compute a hash of the static password, and the communications hardware 306 may access a database of password hashes to complete the static password verification, as directed by the challenge circuitry 308. In some embodiments the authentication factor may be a biometric or other authentication factor, in addition to or as an alternative to a static password.

At operation 616, the apparatus 300 includes means, such as processor 303, communications hardware 306, challenge circuitry 308, or the like, for providing an authorization message indicating the challenge authentication token was verified. In some embodiments, the authorization message may indicate a duration of time for which access is authorized, or other relevant information.

In some embodiments, the challenge circuitry 308 may generate a user session token to include in the authorization message. The user session token may be configured to allow for secure, authenticated communication between the user device 104 and apparatus 300 and/or another host device 116A-116N for a pre-determined duration. The user session token may contain certain information about the user, the user device 104, the duration of time allowed for the session, or other information.

At operation 612, the apparatus 300 includes means, such as processor 303, communications hardware 306, or the like, for providing a request for secure information with a session authentication token configured with instructions to permit the user access to secure information. In some embodiments, the apparatus 300 may receive a request for secure information from user device 104. In an instance the challenge authentication token was verified, the apparatus 300 may forward the request for secure information with a session token indicating the challenge authentication was verified and/or instructions to permit the user access to secure information to host device 116A-116N. As such, this allows host device 116A-116N to permit the authenticated user access to secure information.

As such, the user device 104 does not communicate directly with the host device 116A-116N to retrieve the secure information, and the session token does not convey an identity of the user of the client system 102. In these embodiments, the apparatus 300 may act as a gatekeeper to permit an application hosted on user device 104 to access a resource hosted on host device 116A. The user, and by extension the client system 102 may not directly interact with host device 116A. For example, a social media application on user device 104 may receive access to an image hosting application on host device 116A that stores personal photographs from the user, and the access token may permit limited access of hosted images to user device 104 for sharing on the social media application. The communications hardware 306 may assign a time duration for the validity of the access token, writing the time duration in the text of the access token. The communications hardware 306 also may encrypt or otherwise protect the access token in such a way that only user device 104 may use the access token to access the secure information of host device 116A.

Although the flowcharts of FIGS. 5-6 describe operations pertaining to a single computing device, it is to be appreciated that a user device and a logon system or server device may be employed to implement knowledge factor identification transaction with a challenge authentication token.

FIGS. 5 and 6 illustrate operations performed by apparatuses, methods, and computer program products according to various example embodiments. It will be understood that each flowchart block, and each combination of flowchart blocks, may be implemented by various means, embodied as hardware, firmware, circuitry, and/or other devices associated with execution of software including one or more software instructions. For example, one or more of the operations described above may be embodied by software instructions. In this regard, the software instructions which embody the procedures described above may be stored by a memory of an apparatus employing an embodiment of the present invention and executed by a processor of that apparatus. As will be appreciated, any such software instructions may be loaded onto a computing device or other programmable apparatus (e.g., hardware) to produce a machine, such that the resulting computing device or other programmable apparatus implements the functions specified in the flowchart blocks. These software instructions may also be stored in a computer-readable memory that may direct a computing device or other programmable apparatus to function in a particular manner, such that the software instructions stored in the computer-readable memory produce an article of manufacture, the execution of which implements the functions specified in the flowchart blocks. The software instructions may also be loaded onto a computing device or other programmable apparatus to cause a series of operations to be performed on the computing device or other programmable apparatus to produce a computer-implemented process such that the software instructions executed on the computing device or other programmable apparatus provide operations for implementing the functions specified in the flowchart blocks.

The flowchart blocks support combinations of means for performing the specified functions and combinations of operations for performing the specified functions. It will be understood that individual flowchart blocks, and/or combinations of flowchart blocks, can be implemented by special purpose hardware-based computing devices which perform the specified functions, or combinations of special purpose hardware and software instructions.

In some embodiments, some of the operations above may be modified or further amplified. Furthermore, in some embodiments, additional optional operations may be included. Modifications, amplifications, or additions to the operations above may be performed in any order and in any combination.

Example System Operations

Figure 7:
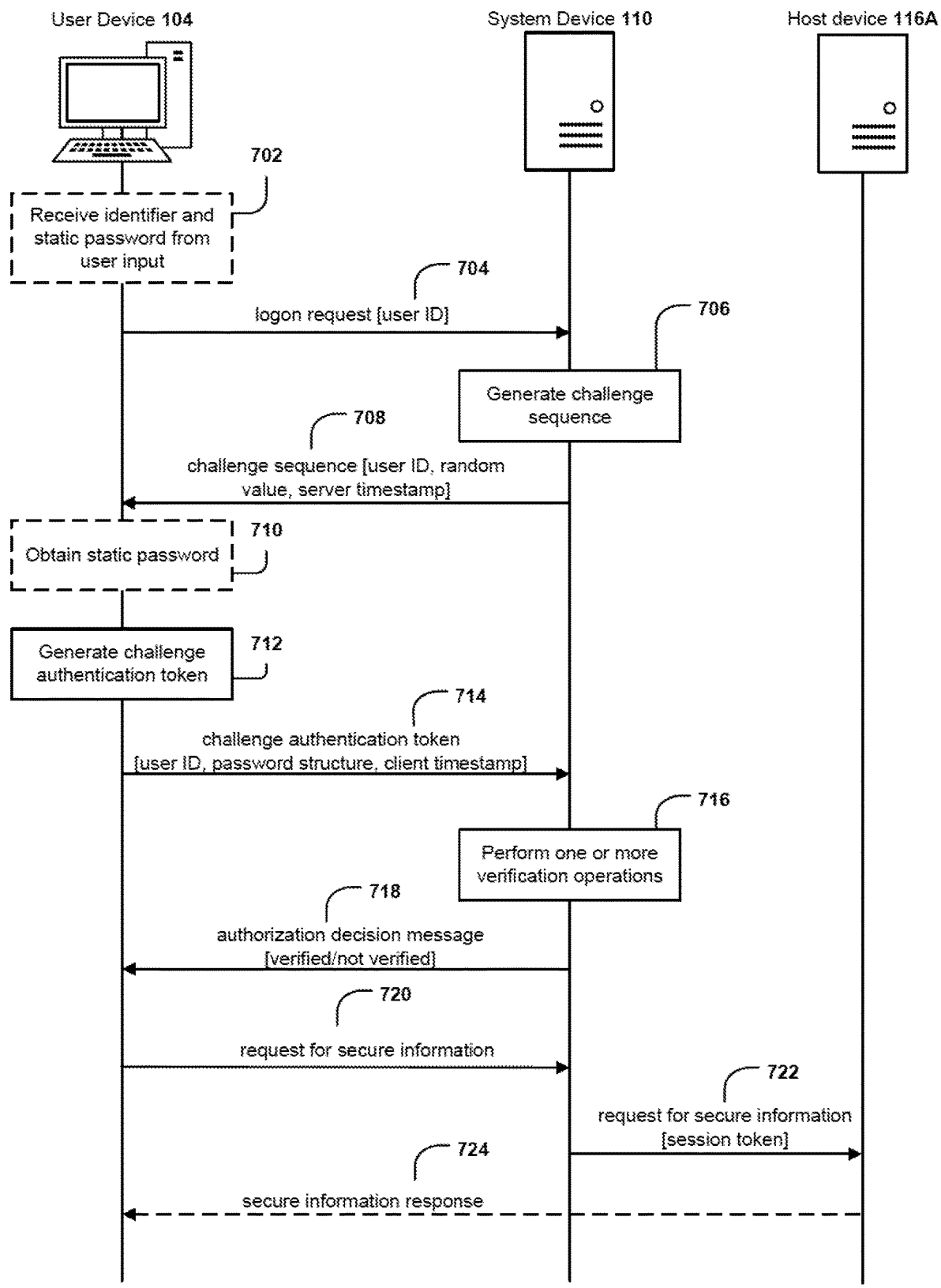
FIG. 7 illustrates a swim lane diagram of operations for authenticating a user using a knowledge factor identification transaction with a challenge authentication token, in accordance with some example embodiments described herein.

FIG. 7 shows a swim lane diagram illustrating example operations (e.g., as described above in connection with FIGS. 5-6) performed by components of the environment depicted in FIG. 1 to produce various benefits from example embodiments. In these figures, operations performed by a user device 104 are shown along the vertical line extending from the element labeled "user device," operations performed by a system device 110 are shown along the vertical line extending from the element labeled "system device." Operations impacting both devices, such as data transmissions between the devices, are shown using arrows extending between these lines. Operations that impact one of a host device 116A-116N are shown using arrows extending to the vertical line below the element labeled "host device." Generally, the operations are ordered temporally with respect to one another. However, it will be appreciated that the operations may be performed in other orders from those illustrated herein.

At operation 702, a user device 104 may receive a user identifier and in some embodiments, a static password from user input. At operation 704, the user device 104 may transmit a logon request comprising the user identifier. At operation 706, the system device 110 may then generate a challenge sequence, which include the user identifier, a random value, and a server timestamp. At operation 708, the system device 110 may provide the challenge sequence to the user device 104.

At operation 710, the user device 104 may obtain the static password, either from input or retrieved from memory based on operation 702. At operation 712, the system device 110 may generate a challenge authentication token which includes the user identifier, a random value, a client timestamp, and the static password. At operation 714 the user device 104 provides the challenge authentication token to the system device 110.

At operation 716, the system device 110 performs one or more verification operations to verify the challenge authentication token. At operation 718, the system device 110 provides an authorization decision message to the user device 104, indicative of whether the challenge authentication token was verified.

At operation 720, the user device 104 provides a request for secure information to the system device 110. At operation 722, the system device 110 may relay the request for secure information to the host device 116A along with a session token indicative of whether the challenge authentication token was verified/the user was authenticated. At operation 724, the user device 104 receives a secure information response, which may include the requested secure information in an instance the challenge authentication token was verified/the user was authenticated.

As described above, example embodiments provide methods and apparatuses that enable knowledge factor identification transaction with a challenge authentication token. Example embodiments thus overcome the problems faced when utilizing password authentication (either as a single factor or as part of a multi-factor identification scheme) or when utilizing multi-factor authentication without a password. Moreover, embodiments described herein avoid the administrative and technical complexity of implementing and maintaining discrete technologies utilized in multi-factor authentication schemes, such as biometric factor authorization.

As these examples all illustrate, example embodiments contemplated herein provide technical solutions that solve real-world problems faced in implementing and maintaining secure remote access to computing resources. While authentication of network communications has been an issue for decades, recent interest in strong authentication by use of multi-factor authentication has highlighted the need for more robust authentication factors, both in terms of security and ease of implementation. While biometric identification and other technologies have risen in popularity, the weaknesses of such approaches point to the need for better methods of password authentication as a strong first line of defense. The application of knowledge factor identification transaction with a challenge authentication token through example embodiments described herein thus represents a technical solution to these real-world problems.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for requesting authentication of a user using a knowledge factor identification transaction with a challenge authentication token in a primary communications band, the method comprising:
    providing, by communications hardware, a logon request, wherein the logon request comprises a user identifier received from a user;
    receiving, by the communications hardware and using the primary communications band, a challenge sequence, wherein the challenge sequence is a random value, wherein the primary communications band comprises a first associated device, a second associated device, and a set of software instructions for exchanging information between the first associated device and the second associated device;

generating, by authentication circuitry, a password structure, wherein the password structure is based on a static password received from the user and the challenge sequence;

generating, by the authentication circuitry, a challenge authentication token comprising the user identifier, the password structure, and a client timestamp;

providing, by the communications hardware and using the primary communications band, the challenge authentication token; and receiving, by the communications hardware and using the primary communications band, an authorization decision message, wherein the authorization decision message is indicative of whether the challenge authentication token was verified.

2. The method of claim 1, further comprising:
encrypting, by cryptographic circuitry, one or more of: the logon request, the password structure, or the challenge authentication token.

3. The method of claim 2, wherein encrypting comprises using one or more public key encryption algorithms or post-quantum cryptography (PQC) algorithms.

4. The method of claim 1, further comprising:
obtaining, by the communications hardware, a shared cryptographic key, wherein the shared cryptographic key is known to a logon system;
encrypting, by a cryptographic circuitry, the logon request using the shared cryptographic key, and
encrypting, by the cryptographic circuitry, the challenge authentication token using the shared cryptographic key.

5. The method of claim 1, further comprising:
in an instance the authorization decision message is indicative that the challenge authentication token was verified, receiving, by the communications hardware and using the primary communications band, a secure information response in response to a request for secure information.

6. The method of claim 1, further comprising:
receiving, by the communications hardware, the user identifier and the static password associated with the user identifier from user input.

7. The method of claim 1, wherein generating the password structure further comprises:
appending, by the authentication circuitry, the static password to the challenge sequence to generate the password structure.

8. The method of claim 1, further comprising:
providing, by the communications hardware and using a secondary communications band, one or more additional authentication tokens, wherein the one or more additional authentication tokens comprise one or more of: biometric factor data, a second password structure, or user device data.

9. The method of claim 1, wherein the challenge authentication token further comprises one or more of: biometric factor data, a second password structure, or user device data.

10. The method of claim 1, wherein the challenge authentication token excludes any biometric factor data of the user.

11. An apparatus for requesting authentication of a user using a knowledge factor identification transaction with a challenge authentication token in a primary communications band, the apparatus comprising:

communications hardware configured to:
provide a logon request, wherein the logon request comprises a user identifier received from a user,
receive, using the primary communications band a challenge sequence, wherein the challenge sequence is a random value, wherein the primary communications band comprises a first associated device, a second associated device, and a set of software instructions for exchanging information between the first associated device and the second associated device,
provide the challenge authentication token using the primary communications band, and
receive an authorization decision message using the primary communications band, wherein the authorization decision message is indicative of whether the challenge authentication token was verified; and authentication circuitry configured to:
generate a password structure, wherein the password structure is based on a static password received from the user and the challenge sequence, and
generate a challenge authentication token comprising the user identifier, the password structure, and a client timestamp.

12. The apparatus of claim 11, further comprising:
cryptographic circuitry configured to:
encrypt one or more of the logon request, the password structure, or the challenge authentication token.

13. The apparatus of claim 12, wherein encrypting comprises using one or more public key encryption algorithms or post-quantum cryptography (PQC) algorithms.

14. The apparatus of claim 11, wherein:
the communications hardware is further configured to:
obtain a shared cryptographic key, wherein the shared cryptographic key is known to a logon system; and
the apparatus further comprises cryptographic circuitry configured to:
encrypt the logon request using the shared cryptographic key, and
encrypt the challenge authentication token using the shared cryptographic key.

15. The apparatus of claim 11, wherein the communications hardware is further configured to:
in an instance the authorization decision message is indicative that the challenge authentication token was verified, receive, using the primary communications band, a secure information response in response to a request for secure information.

16. The apparatus of claim 11, wherein the communications hardware is further configured to:
receive the user identifier and the static password associated with the user identifier from user input.

17. The apparatus of claim 11, wherein the authentication circuitry is further configured to:
append the static password to the challenge sequence to generate the password structure.

18. The apparatus of claim 11, wherein the communications hardware is further configured to:
provide, using a secondary communications band, one or more additional authentication tokens, wherein the one or more additional authentication tokens comprise one or more of biometric factor data, a second password structure, or user device data.

19. The apparatus of claim 11, wherein the challenge authentication token further comprises one or more of: biometric factor data, a second password structure, or user device data.

20. A computer program product for requesting authentication of a user using a knowledge factor identification transaction with a challenge authentication token in a primary communications band, the computer program product comprising at least one non-transitory computer-readable storage medium storing software instructions that, when executed, cause an apparatus to:

provide a logon request, wherein the logon request comprises a user identifier received from a user;

receive a challenge sequence using the primary communications band, wherein the challenge sequence is a random value, wherein the primary communications band comprises a first associated device, a second associated device, and a set of software instructions for exchanging information between the first associated device and the second associated device;

generate a password structure, wherein the password structure is based on a static password received from the user and the challenge sequence;

generate a challenge authentication token comprising the user identifier, the password structure, and a client timestamp;

provide the challenge authentication token using the primary communications band; and receive an authorization decision message using the primary communications band, wherein the authorization decision message is indicative of whether the challenge authentication token was verified.

* * * * *